(12) United States Patent
Tamkeen et al.

(10) Patent No.: US 12,131,193 B1
(45) Date of Patent: Oct. 29, 2024

(54) SMART AND OPTIMIZED DATA LOADER

(71) Applicant: INTUIT INC., Mountain View, CA (US)

(72) Inventors: Mohammad Saman Tamkeen, Bangalore (IN); Jayanth Saimani, Bangalore (IN)

(73) Assignee: INTUIT INC., Mountain View, CA (US)

( * ) Notice: Subject to any disclaimer, the term of this patent is extended or adjusted under 35 U.S.C. 154(b) by 0 days.

(21) Appl. No.: 18/352,983

(22) Filed: Jul. 14, 2023

(51) Int. Cl.
*G06F 16/21* (2019.01)
*G06F 9/50* (2006.01)
*H04L 43/0876* (2022.01)

(52) U.S. Cl.
CPC ............ *G06F 9/505* (2013.01); *G06F 16/214* (2019.01); *H04L 43/0876* (2013.01); *G06F 2209/503* (2013.01)

(58) Field of Classification Search
None
See application file for complete search history.

(56) References Cited

U.S. PATENT DOCUMENTS

| 2011/0167039 A1* | 7/2011 | Kol | G06F 16/273 707/633 |
| 2016/0335009 A1* | 11/2016 | Vijayan | G06F 11/1469 |
| 2019/0236150 A1* | 8/2019 | Zaslavsky | G06F 16/2308 |

* cited by examiner

*Primary Examiner* — Shirley X Zhang
(74) *Attorney, Agent, or Firm* — DLA Piper LLP US

(57) ABSTRACT

A method for controlling software agent workers for migrating data between databases. The method monitors resource utilization of at least one of the databases during the migration of the data and compares the monitored resource utilization to a desired resource utilization range. When the comparison indicates that the monitored resource utilization is less than the desired resource utilization range, the method additively deploys additional software agent workers. When the comparison indicates that the monitored resource utilization is greater than the desired resource utilization range, the method multiplicatively removes software agent workers.

14 Claims, 7 Drawing Sheets

SMART AND OPTIMIZED DATA LOADER

BACKGROUND

Some conventional systems are known to provide data migration services where large volumes of data are migrated from one database to another. These conventional systems are deficient because data migration is not optimized based on database resources. This leads to underutilized or overutilized database resources during the migration process, both of which are undesirable.

SUMMARY

Embodiments disclosed herein solve the aforementioned technical problems and may provide other technical solutions as well. Contrary to conventional techniques that implement deployment management of software agents for data migration between databases, one or more embodiments disclosed herein implement a smart and optimized data loader.

An example embodiment includes a method performed by a processor. The method may comprise deploying software agent workers to an agent workforce. The software agent workers migrate data from a first database to a second database, monitor resource utilization of at least one of the first database or the second database during the migration of the data and compare the monitored resource utilization to a desired resource utilization range. When the comparison indicates that the monitored resource utilization is less than the desired resource utilization range, the method additively deploys one or more additional software agent workers to the agent workforce, where the one or more additional software agent workers migrate the data from the first database to the second database. When the comparison indicates that the monitored resource utilization is greater than the desired resource utilization range, the method multiplicatively removes one or more of the software agent workers from the agent workforce.

Another example embodiment includes a system. The system may comprise a non-transitory storage medium storing computer program instructions, and one or more processors configured to execute the computer program instructions to cause operations to be performed. The operations may comprise deploying software agent workers to an agent workforce, the software agent workers migrate data from a first database to a second database, monitor resource utilization of at least one of the first database or the second database during the migration of the data, and compare the monitored resource utilization to a desired resource utilization range. When the comparison indicates that the monitored resource utilization is less than the desired resource utilization range, the system additively deploys one or more additional software agent workers to the agent workforce, where the one or more additional software agent workers migrate the data from the first database to the second database. When the comparison indicates that the monitored resource utilization is greater than the desired resource utilization range, the system multiplicatively removes one or more of the software agent workers from the agent workforce.

DETAILED DESCRIPTION OF SEVERAL EMBODIMENTS

To mitigate the above deficiencies, embodiments disclosed herein leverage the management of software agents for performing optimized data migration between databases.

In one example, a large amount of data may be desired to be migrated from a first database (e.g., data lake) to a second database (e.g., one or more relational databases). The smart and optimized data loader system described herein monitors resource utilization (e.g., processor utilization) of the source and/or destination databases and uses the monitored resource utilization to manage software agents that perform the data migration. In general, the smart and optimized data loader system adds software agents when the monitored resource utilization is a below a threshold and removes software agents when the monitored resource utilization is above a threshold. This allows the smart and optimized data loader system to maintain resource utilization within a desired range that optimizes data migration while avoiding system overload. In one example, the smart and optimized data loader system additively deploys software agents and multiplicatively removes software agents.

The figures herein are described with respect to disclosed system and methods of providing a smart and optimized data loader system. A specific example with respect to a data lake and a relational database is described herein. However, it is noted that the disclosed system and methods are applicable to various types of databases.

Figure 1:
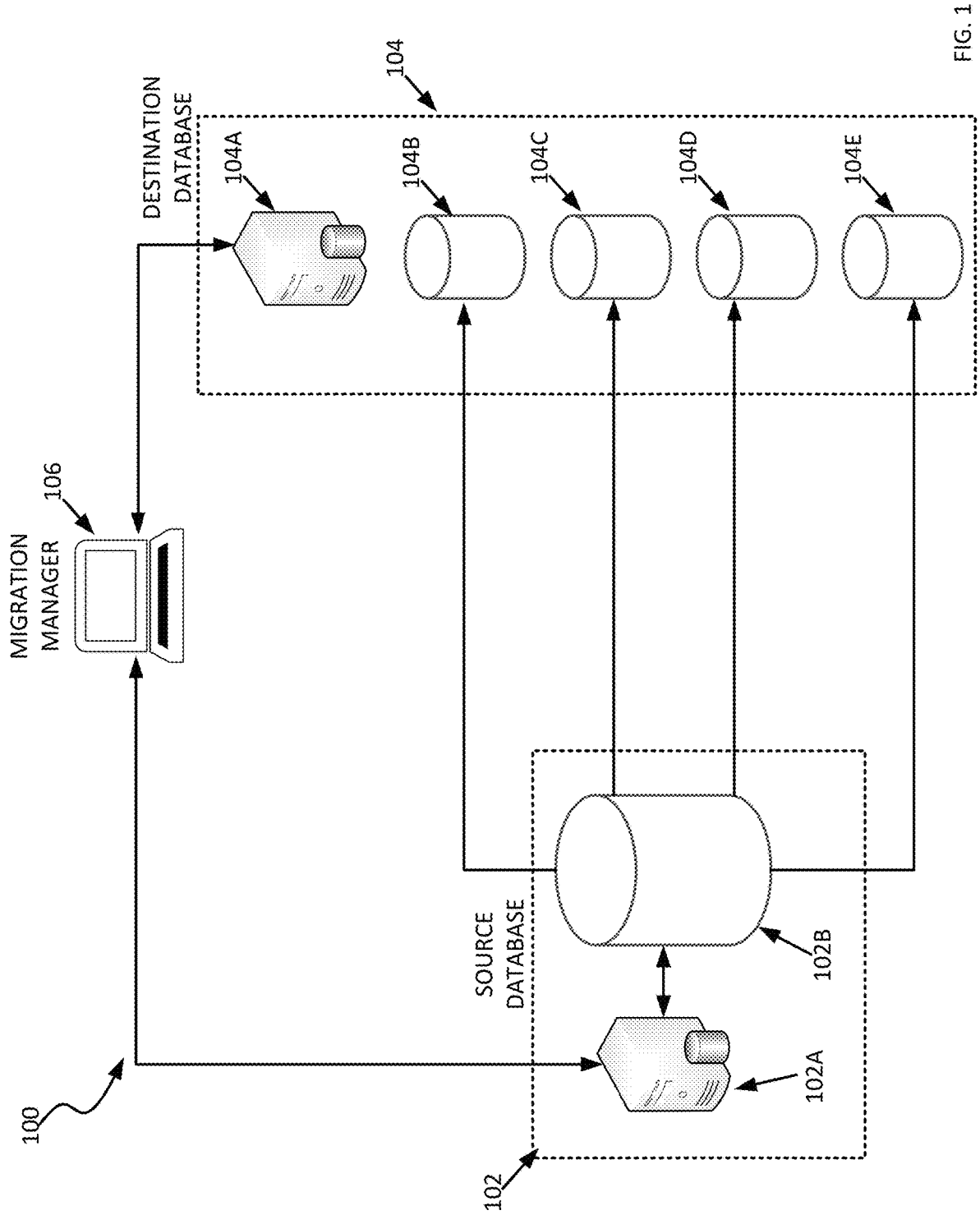
FIG. 1 shows a block diagram of a smart and optimized data loader system, based on the principles disclosed herein.
Figure 2:
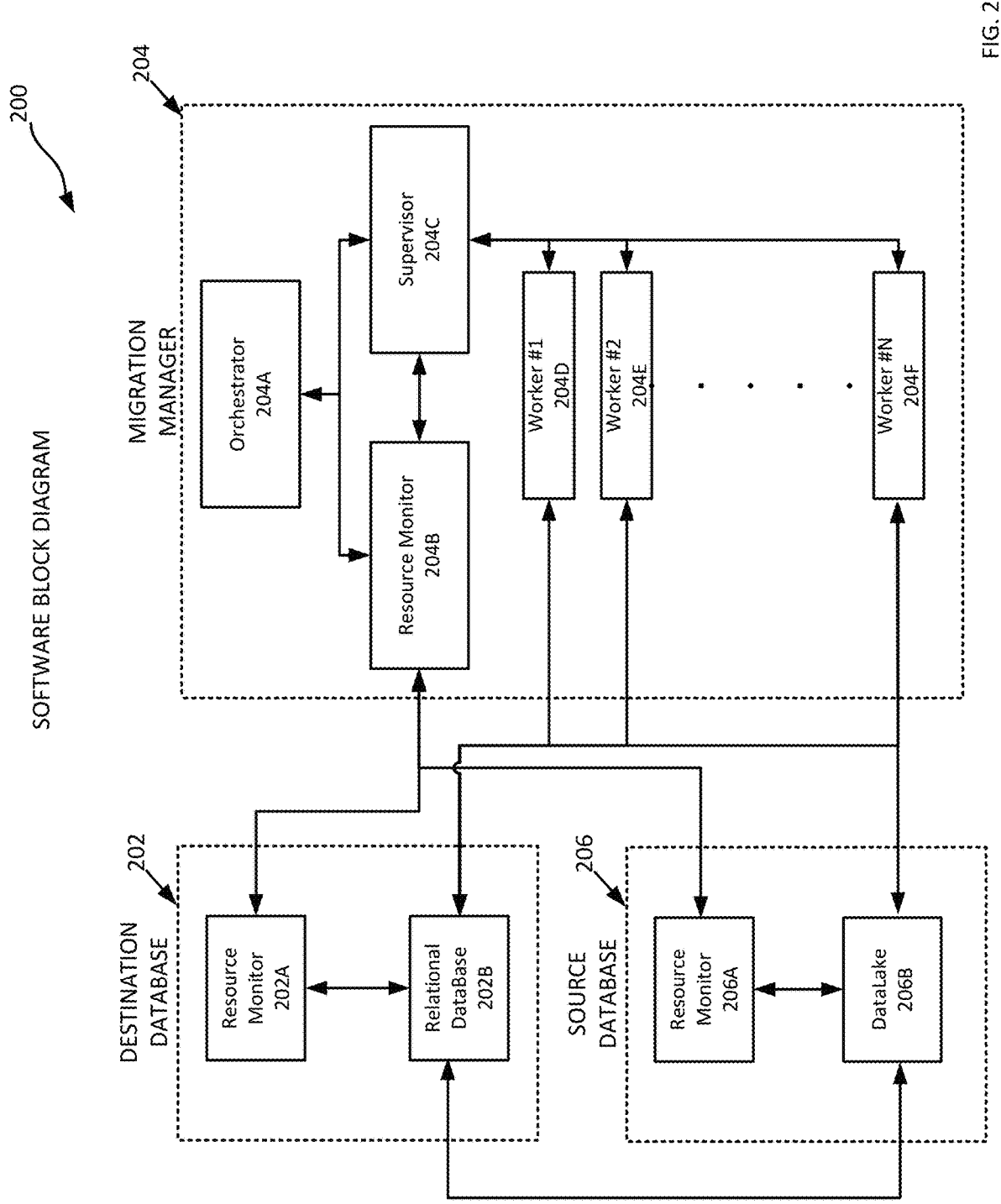
FIG. 2 shows another block diagram of a smart and optimized data loader system, based on the principles disclosed herein.
Figure 3:
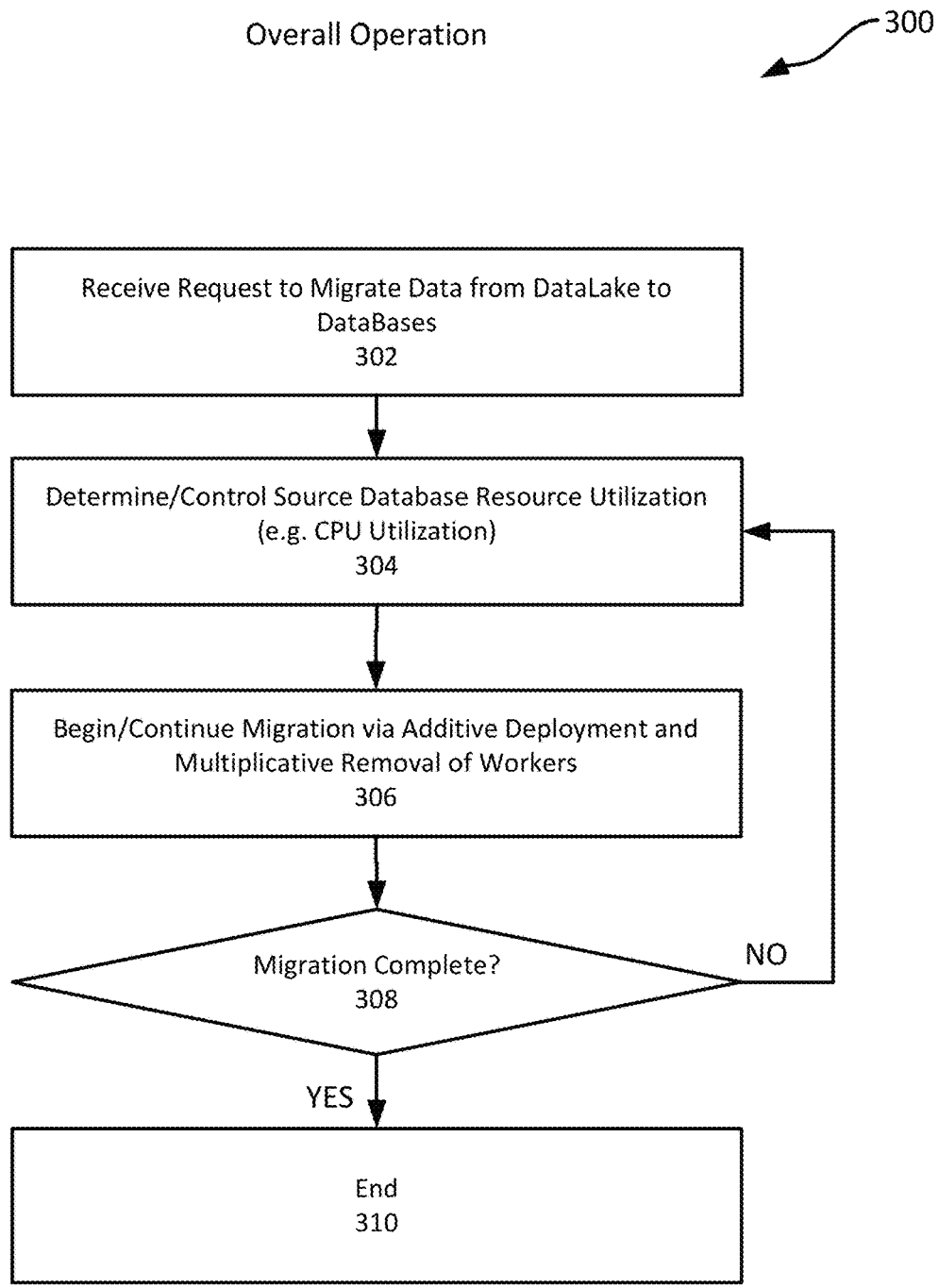
FIG. 3 shows a flowchart for overall operation of the smart and optimized data loader system, based on the principles disclosed herein.
Figure 4:
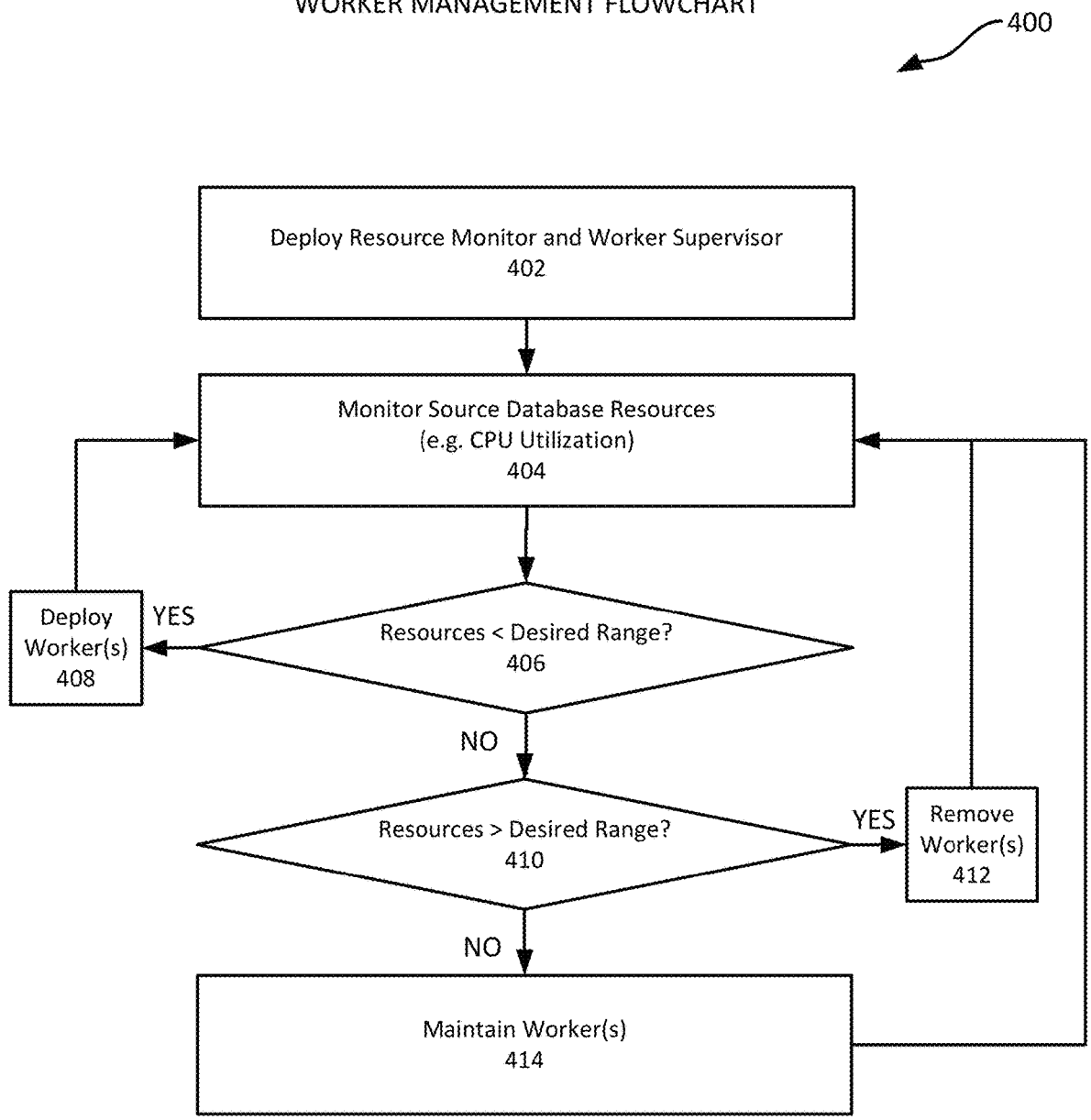
FIG. 4 shows a flowchart for worker management of the smart and optimized data loader system, based on the principles disclosed herein.
Figure 5:
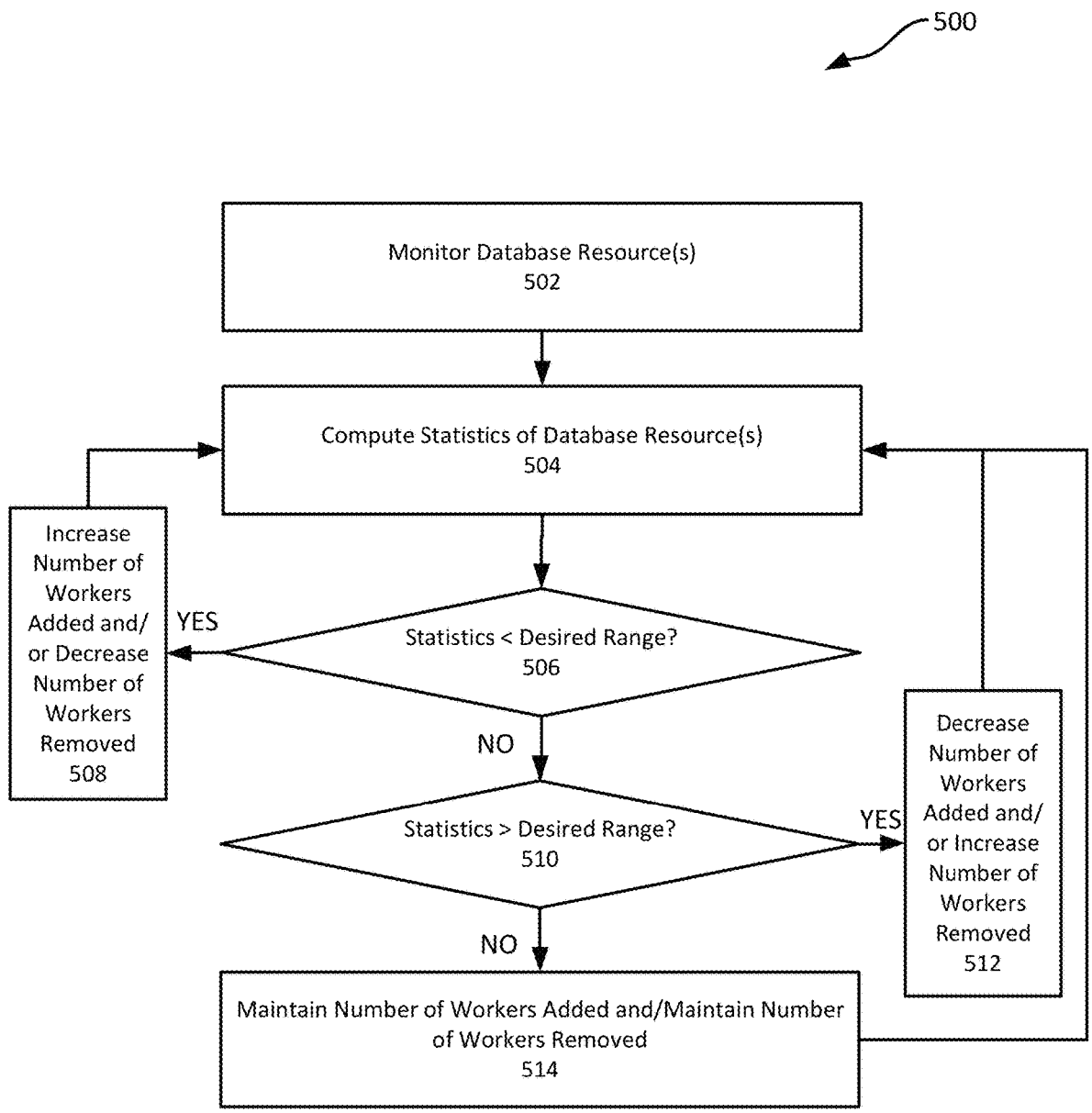
FIG. 5 shows a flowchart for algorithm adjustment of the smart and optimized data loader system, based on the principles disclosed herein.
Figure 6:
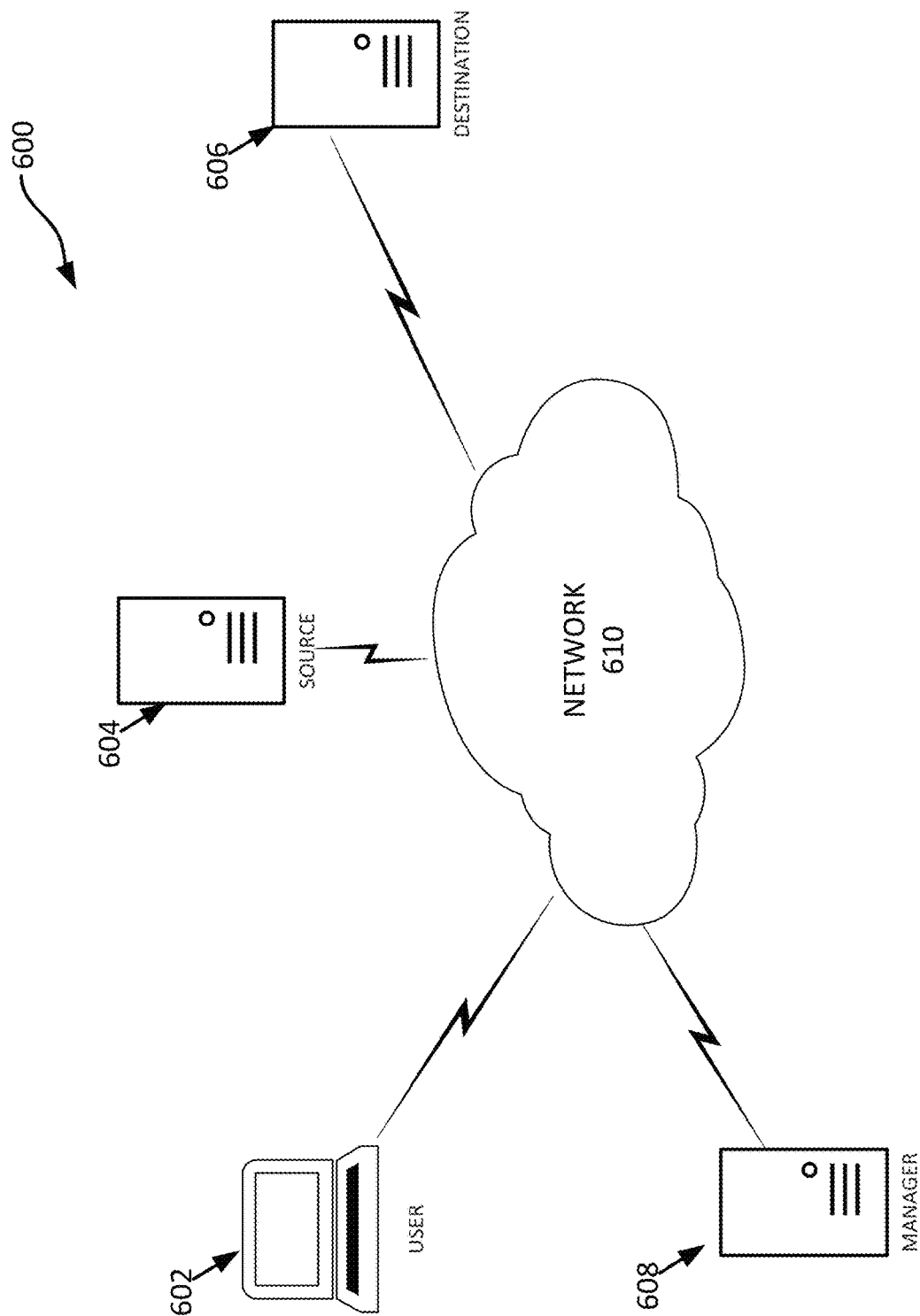
FIG. 6 shows a network diagram of the smart and optimized data loader system, based on the principles disclosed herein.
Figure 7:
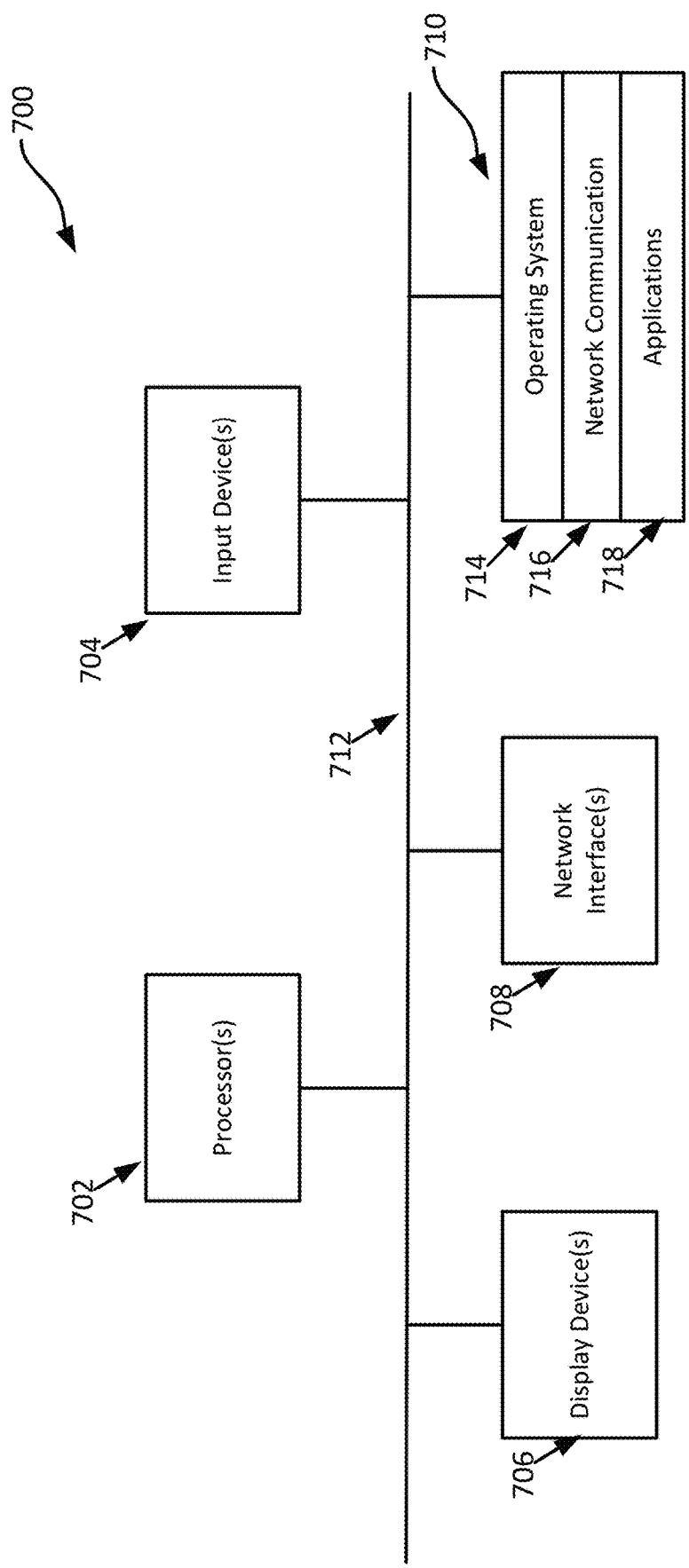
FIG. 7 shows a block diagram of an example computing system that implements various features and processes of the smart and optimized data loader system, based on the principles disclosed herein.

The above-described features are now described in detail with respect to FIGS. 1-7. Specifically, FIGS. 1-2 are block diagrams showing the smart and optimized data loader system, FIGS. 3-5 are flowcharts describing the example methods performed by the disclosed smart and optimized data loader system, and FIGS. 6 and 7 show example hardware for implementing the disclosed smart and optimized data loader system.

FIG. 1 shows a block diagram 100 of a smart and optimized data loader system including a source database 102, destination database 104 and a migration manager 106 that manages data migration between source database 104 and destination database 104. In one example, source database 102 may include a processing server 102A and data storage 102B (e.g., data lake), while destination database 104 may include processing server 104A and databases 104B, 104C, 104D and 104E (e.g., relational databases).

During operation, migration manager 106 may receive a request from destination database 104 to retrieve data from source database 102. Migration manager 106 may begin data migration from source database 102 to destination database 104 by deploying software agents as part of an agent workforce (i.e., total number of agents) to retrieve the requested data. The software agents may have the ability to retrieve the requested data, analyze the structure of the retrieved data, determine how the retrieved data maps to the schema relational database and perform storage of the retrieved data in the destination database 104.

For example, software agents may be deployed with instructions to retrieve specific data from data storage 102B. In response to these instructions, the software agents may access and transmit the requested data from storage 102B. The software agents may then map the retrieved data to a designated storage(s) 104B-104E depending on various factors including but not limited to the structure of the data and the parameters of the storage devices 104B-104E.

For example, the software agent may analyze the data to identify schema based on tables, fields and other relationships and dependencies. The software agent may then decide which of the storage devices 104B-104E are capable storing the retrieved data. It is noted that retrieved data may be processed by the agents to transform the retrieved data to fit the structure of the relational database where the data is to be stored. These transformations may include data cleaning and data mapping to name a few. This process ensures that the unknown form of the data retrieved from the data lake is analyzed and routed to a compatible one of the storage devices 104B-104E. The software agents may perform other operations after loading the data into the relational databases. These operations may include validating that the data has been accurately migrated and indexing of data fields among others.

The software agents performing the data migration are computer programs that perform data migration tasks on behalf of the migration manager. These tasks may include communicating with the source database, retrieving data from the data lake, analyzing data and databases for schema, manipulating the data and determining how data is to be stored in the relational databases. The functionality of these software agents is generally determined by migration manager 106. For example, migration manager 106 may dictate how many software agents are operational at any given time, identify the source database and destination database for the software agents to coordinate the migration, and determine how the software agents analyze and manipulate the migration data.

Determining how many software agents are operational at a given time is beneficial because the number of live software agents generally correlates to the resource utilization of at least one of the source database and/or the destination database. Generally, the resource utilization (e.g., processor utilization) of the database increases as the number of live software agents increases. Therefore, migration manager 106 is able to control resource utilization during the data migration by increasing or decreasing the number of software agents operating at any given time. In one example, migration manager 106 may monitor resource utilization of at least one of the source database or the destination database, and increase or decrease the number of software agents to maintain the resource utilization in a desired range (e.g., maintain processor utilization in the range of 70%-80%). This ensures that the resources of the database are utilized in an efficient manner without overloading the resources. This is beneficial because other systems and agents may also be using the databases.

FIG. 2 shows a detailed block diagram 200 of the smart and optimized data loader system in FIG. 1. In FIG. 2, the smart and optimized data loader system generally includes destination database 202 having resource monitor 202A and relational database 202B, source database 206 having resource monitor 206A and data lake 206B, and migration manager 204 having orchestrator 204A, resource monitor 204B, agent supervisor 204C and one or more software agent workers 204D, 204E and 204F.

It is noted that the various blocks shown in destination database 202, source database 206 and migration manager 204 may be implemented in software executed in one or more hardware platforms. It is also noted that the resource monitors 202A and 206A may be local to their respective databases or may be remote devices that remotely monitor the resources of the respective databases. The resources may be monitored continuously or periodically at set times.

During operation, as described above with respect to FIG. 1 the overall operation of the smart and optimized data loader system includes the migration manager deploying and managing software agent workers to facilitate data migration from source database 206 to destination database 202. These software agent workers are deployed and managed based on resource utilization of one or more of the source database 206 and destination database 202.

For example, there may be a scenario where an entity wants to migrate data from data lake 206B to relational database 202B. In such a scenario, orchestrator 204A sends initialization instructions to resource monitor 204B and supervisor 204C. These instructions may include providing utilization thresholds (e.g., upper and lower thresholds) to resource monitor 204B for determining when to trigger the deployment or removal of one or more software agent workers and providing information on which types of utilization metrics are to be monitored (e.g., CPU utilization, memory utilization, etc.). These instructions may also include providing values for dictating how many of the software agent workers are deployed or removed with each action. For example, these values may include an additive value for deploying one or more software agent workers and a multiplicative value for removing a predetermined percentage of the live software agent workers from the workforce.

Once initialized, resource monitor 204B may receive resource utilization data from one or more of resource monitor 202A and 206A. Retrieval of this resource utilization data may be initiated by resource monitor 204B performing polling or may be initiated by resource monitors 202A and 206A transmitting updates periodically, arbitrarily or in response to some resource triggering event (e.g., resources sharply increasing or decreasing). In either case, resource monitor 204B retrieves the resource utilization data. Resource monitor 204B then compares the resource utilization data (e.g., CPU utilization) to the upper and lower utilization thresholds (e.g., 70% lower threshold and 80% upper threshold).

If the resource utilization data is less than the lower utilization threshold (e.g., <70% CPU utilization), then a message is sent to supervisor 204C to add one or more software agent workers (e.g., if the additive value is +1, then one additional software agent worker is added to the workforce) to perform data migration from data lake 206B to relational database 202B. As mentioned above, the software worker agent (e.g., 204D) may begin performing data migration by instructing the processor (not shown) of destination database 202 to begin retrieving data from data lake 206B, formatting the data if desired and storing the data in relational database 202B. As long as the resource utilization data is less than the lower utilization threshold, more software agent workers are added to the workforce. The frequency of adding the software agent workers may be dependent upon the frequency in which the resource monitor 204B receives utilization updates from destination database 202 and/or source database 206.

In contrast, If the resource utilization data is greater than the upper utilization threshold (e.g., >80% CPU utilization), then a message is sent to supervisor 204C to remove a percentage of the one or more software agent workers from the workforce (e.g., if the multiplicative value is 0.5, then half of the active software agent workers are removed from the workforce). The remaining software agent workers may continue to perform the data migration, while the removed software agent workers no longer perform data migration. As long as the resource utilization data is greater than the upper utilization threshold, more software agent workers are removed. Again, the frequency of removing the software agent workers may similarly be dependent upon the frequency in which the resource monitor 204B receives utilization updates from destination database 202 and/or source database 206.

A goal of adding software agent workers when the resource utilization is below the lower utilization threshold and removing software agent workers when the resource utilization is above the upper threshold is to force the CPU utilization to operate in a desired range (e.g., 70% to 80%) that facilitates efficient (e.g., optimal) data migration while avoiding overloading the resources of the source or destination databases. In other words, when the resource utilization is determined to be greater than the lower threshold and less than the upper threshold (i.e., within the desired range) supervisor 204C maintains the current number of live software agent workers performing the data migration (i.e., no agents are added or removed).

It is noted that the resources of the destination database 202 and/or resources of the source database 206 may be monitored and used to control management of the software agent workers. The decision on whether to monitor and use the resources from the destination database 202, source database 206 or both may be determined by migration manager 204 based on various factors including but not limited to the type of data migration actions being performed and the identities of the databases.

FIG. 3 shows a flowchart 300 for overall operation of the smart and optimized data loader system disclosed herein. In step 302, migration manager 204 receives a request to migrate data from data lake 206B to relational database 202B. This request may be received via a user interface. For example, a data migration software application may be executed by the user on a separate user device or on the migration manager use device. The data migration software application, for example, may have inputs for the user to identify the source database and the destination database, identify the data to be migrated, set the upper and lower utilization thresholds, set the additive and multiplicative values associated with deploying/removing the software agent workers, and schedule timing of the migration to name a few. Alternatively, some of the above identified inputs (e.g., upper and lower utilization thresholds, additive and multiplicative values associated with deploying/removing the software agent workers, etc.) may be determined and set by the destination database 202 and/or the source database 206.

Once the request is received, migration manager 204 proceeds to initiate the migration in step 304 by determining the resource utilization. For example, resource monitor 204B receives resource utilization data from resource monitor 202A and/or resource monitor 206A. Once the resource utilization data is received, migration manager 204 performs the data migration by adding software agent workers via additive deployment (e.g., adding 1 additional worker if the utilization is below the lower threshold) and multiplicative removal (e.g., removing 50% of workers if the utilization is above the upper threshold). In step 308, migration manager 204 determines if data migration is complete or not. If data migration is not complete, then steps 304 and 306 are repeated. In general, step 304 may be repeated every time new resource utilization data is available. This is beneficial to ensuring that resource utilization is up to date.

If data migration is complete, then migration manager 204 may end the data migration process in step 310. Once ended, a message or report may be sent from migration manager 204 to the user device that requested the data migration. Among others, the report may show what data was migrated successfully, the resource utilization during the migration and duration of the migration.

FIG. 4 shows a flowchart for 400 of worker management for the smart and optimized data loader system disclosed herein. As described above, migration manager 204 performs data migration by managing the software agent workers via additive deployment of agents and multiplicative removal of agents. For example, in step 402, orchestrator 204A deploys and initializes resource monitor 204B and software agent worker supervisor 204C. In step 404, resource monitor 204B monitors resource utilization (e.g., CPU utilization) of relational database 202B and/or data lake 206B. Resource monitor 204B then compares the resource utilization to a desired utilization range defined between an upper and lower resource utilization threshold. For example, in step 406, resource monitor 204B determines if the resource utilization is less than the desired range or not. If resource utilization is less than the desired range, then in step 408, one or more software agent workers are additively deployed to perform data migration. If resource utilization is not less than the desired range, then in step 410, resource monitor 204B determines if the resource utilization is greater than the desired range or not. If resource utilization is greater than the desired range, then in step 412, one or more software agent workers are multiplicatively removed from performing data migration. If resource utilization is not greater than the desired range, then resource monitor 204B may maintain the number of software agent workers in step 414. This process is generally repeated until data migration is complete.

Various steps supporting the management of the software agent workers may be adjustable to further optimize the system. These adjustments may include adjustments to frequency of monitoring resources, frequency of deploying/removing software agent workers, the values of the additive deployment and multiplicative removal of agents, and adjustments to the upper and lower resource utilization thresholds to name a few.

FIG. 5 shows a flowchart 500 for algorithm adjustment of the smart and optimized data loader system disclosed herein. In step 502, resource monitor 204B monitors the resources of the source database and/or the destination database and computes statistics of these resources in step 504. These statistics may include metrics such as average value and variance of resource utilization as compared to various factors such as time of day/week, the type of data being migrated, the identities of the source/destination databases, etc. These statistics may then be useful in determining how the algorithm of the smart optimized data loader system can be further refined to improve data migration performance.

For example, in step 506, one or more statistics (e.g., average CPU usage) are compared to a desired range. If the one or more statistics are less than the desired range, then in step 508, the system increases the additive value for deploying software agent workers and/or decreases the multiplicative value for removing the software agent workers with the goal of increasing the statistics over time. For example, the additive value for deploying software agent workers may be increased from +1 to +2, and/or the multiplicative value for removing the software agent workers may be decreased from 0.5 to 0.4, etc. If the one or more statistics are not less than the desired range, then in step 510, the system determines if the one or more statistics are greater than the desired range. If the one or more statistics are greater than the desired range, then in step 512, the system decreases the additive value for deploying software agent workers and/or increases the multiplicative value for removing the software agent workers with the goal of decreasing the statistics over time. For example, the additive value for deploying software agent workers may be increased from +2 to +1, and/or the multiplicative value for removing the software agent workers may be decreased from 0.4 to 0.5, etc. In contrast, if the one or more statistics are not greater than the desired range, then in step 514, the system maintains the additive value for deploying software agent workers and the multiplicative value for removing the software agent workers. In general, this process is repeated to ensure that the additive value for deploying software agent workers and the multiplicative value for removing the software agent workers are in efficient ranges.

FIG. 6 shows an example of a system 600 configured for providing smart the optimized data loader system shown in FIGS. 1 and 2. It should be understood that the components of the system 600 shown in FIG. 6 and described herein are merely examples and systems with additional, alternative, or fewer number of components should be considered within the scope of this disclosure.

As shown, the system 600 comprises at least one end user device 602 and servers 604, 606 and 608 interconnected through a network 610. In the illustrated example, server 604 supports operation of the source database, server 606 supports operation of the destination database and server 608 supports operation of the migration manager. In the illustrated example, user device 602 is a PC but could be any device (e.g., smartphone, tablet, etc.) providing access to the servers via network 610. User device 602 has a user interface UI, which may be used to communicate with the servers using the network 610 via a browser or via software applications. For example, user device 602 may allow the user to access the data migration manager application running on server 608, thereby initiating and controlling a desired data migration. The network 610 may be the Internet and or other public or private networks or combinations thereof. The network 610 therefore should be understood to include any type of circuit switching network, packet switching network, or a combination thereof. Non-limiting examples of the network 610 may include a local area network (LAN), metropolitan area network (MAN), wide area network (WAN), and the like.

In an example, end user device 602 may communicate with server 608 via a software application to control the smart and optimized data loader system disclosed herein. The software application may initiate manager server 608 to perform data migration between source database server 604 and destination database server 606 according to the systems/methods shown in FIGS. 1-5.

Servers 604, 606, 608 and user device 602 are each depicted as single devices for ease of illustration, but those of ordinary skill in the art will appreciate that servers 604, 606, 608 and user device 602 may be embodied in different forms for different implementations. For example, any or each of the servers may include a plurality of servers including a plurality of databases, etc. Alternatively, the operations performed by any of the servers may be performed on fewer (e.g., one or two) servers. In another example, a plurality of user devices (not shown) may communicate with the servers. Furthermore, a single user may have multiple user devices (not shown), and/or there may be multiple users (not shown) each having their own respective user devices (not shown). Regardless, the hardware configuration shown in FIG. 6 may be a system that supports the functionality of the smart and optimized data loader system shown in FIGS. 1-5.

FIG. 7 shows a block diagram of an example computing device 700 that is configured for facilitating the smart and optimized data loader system based on the principles disclosed herein. For example, computing device 700 may function as the servers 604, 606, 608 and/or user device 602, or a portion or combination thereof in some embodiments. The computing device 700 performs one or more steps of the methods shown in FIGS. 1-5. The computing device 700 is implemented on any electronic device that runs software applications derived from compiled instructions, including without limitation personal computers, servers, smart phones, media players, electronic tablets, game consoles, email devices, etc. In some implementations, the computing device 700 includes one or more processors 702, one or more input devices 704, one or more display devices 706, one or more network interfaces 708, and one or more computer-readable media 710. Each of these components is coupled by a bus 712.

Display device 706 includes any display technology, including but not limited to display devices using Liquid Crystal Display (LCD) or Light Emitting Diode (LED) technology. Processor(s) 702 uses any processor technology, including but not limited to graphics processors and multi-core processors. Input device 704 includes any known input device technology, including but not limited to a keyboard (including a virtual keyboard), mouse, track ball, and touch-sensitive pad or display. Bus 712 includes any internal or external bus technology, including but not limited to ISA, EISA, PCI, PCI Express, USB, Serial ATA or FireWire. Computer-readable medium 710 includes any non-transitory computer readable medium that provides instructions to processor(s) 702 for execution, including without limitation, non-volatile storage media (e.g., optical disks, magnetic disks, flash drives, etc.), or volatile media (e.g., SDRAM, ROM, etc.).

Computer-readable medium 710 includes various instructions 714 for implementing an operating system (e.g., Mac OS®, Windows®, Linux). The operating system may be multi-user, multiprocessing, multitasking, multithreading, real-time, and the like. The operating system performs basic tasks, including but not limited to: recognizing input from input device 704; sending output to display device 706; keeping track of files and directories on computer-readable medium 710; controlling peripheral devices (e.g., disk drives, printers, etc.) which can be controlled directly or through an I/O controller; and managing traffic on bus 712. Network communications instructions 716 establish and maintain network connections (e.g., software for implementing communication protocols, such as TCP/IP, HTTP, Ethernet, telephony, etc.). Application(s) 718 may comprise an application that uses or implements the processes described herein and/or other processes. The processes may also be implemented in the operating system.

The described features may be implemented in one or more computer programs that may be executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program may be written in any form of programming language (e.g., Objective-C, Java), including compiled or interpreted languages, and it may be deployed in any form, including as a stand-alone program or as a module, component, subroutine, or other unit suitable for use in a computing environment. In one embodiment, this may include Python. The computer programs therefore are polyglots.

Suitable processors for the execution of a program of instructions may include, by way of example, both general and special purpose microprocessors, and the sole processor or one of multiple processors or cores, of any kind of computer. Generally, a processor may receive instructions and data from a read-only memory or a random-access memory or both. The essential elements of a computer may include a processor for executing instructions and one or more memories for storing instructions and data. Generally, a computer may also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data may include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

To provide for interaction with a user, the features may be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features may be implemented in a computer system that includes a back-end component, such as a data server, or that includes a middleware component, such as an application server or an Internet server, or that includes a front-end component, such as a user computer having a graphical user interface or an Internet browser, or any combination thereof. The components of the system may be connected by any form or medium of digital data communication such as a communication network. Examples of communication networks include, e.g., a telephone network, a LAN, a WAN, and the computers and networks forming the Internet.

The computer system may include user devices and servers. A user device and server may generally be remote from each other and may typically interact through a network. The relationship of user device and server may arise by virtue of computer programs running on the respective computers and having a relationship with each other.

One or more features or steps of the disclosed embodiments may be implemented using an API. An API may define one or more parameters that are passed between a calling application and other software code (e.g., an operating system, library routine, function) that provides a service, that provides data, or that performs an operation or a computation.

The API may be implemented as one or more calls in program code that send or receive one or more parameters through a parameter list or other structure based on a call convention defined in an API specification document. A parameter may be a constant, a key, a data structure, an object, an object class, a variable, a data type, a pointer, an array, a list, or another call. API calls and parameters may be implemented in any programming language. The programming language may define the vocabulary and calling convention that a programmer will employ to access functions supporting the API.

In some implementations, an API call may report to an application the capabilities of a device running the application, such as input capability, output capability, processing capability, power capability, communications capability, etc.

While various embodiments have been described above, it should be understood that they have been presented by way of example and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. For example, other steps may be provided, or steps may be eliminated, from the described flows, and other components may be added to, or removed from, the described systems. Accordingly, other implementations are within the scope of the following claims.

In addition, it should be understood that any figures which highlight the functionality and advantages are presented for example purposes only. The disclosed methodology and system are each sufficiently flexible and configurable such that they may be utilized in ways other than that shown.

Although the term "at least one" may often be used in the specification, claims and drawings, the terms "a", "an", "the", "said", etc. also signify "at least one" or "the at least one" in the specification, claims and drawings.

Finally, it is the applicant's intent that only claims that include the express language "means for" or "step for" be interpreted under 35 U.S.C. 112 (f). Claims that do not expressly include the phrase "means for" or "step for" are not to be interpreted under 35 U.S.C. 112 (f).

What is claimed is:

1. A method performed by a processor, the method comprising:
    deploying software agent workers to an agent workforce, the software agent workers migrating data from a first database to a second database;
    monitoring resource utilization of at least one of the first database or the second database during the migration of the data;
    comparing the monitored resource utilization to a desired resource utilization range;
    when the comparing indicates that the monitored resource utilization is less than the desired resource utilization range, additively deploying according to an additive value one or more additional software agent workers to the agent workforce, the additive value indicating a predetermined integer number of the additional software agent workers to be deployed to the agent workforce, the one or more additional software agent workers migrating the data from the first database to the second database;

when the comparing indicates that the monitored resource utilization is greater than the desired resource utilization range, multiplicatively removing according to a multiplicative value one or more of the software agent workers from the agent workforce, the multiplicative value indicating a predetermined percentage number of the software agent workers to be removed from the agent workforce;

computing one or more statistical values based on the monitored resource utilization;

increasing one or more of the predetermined integer number of the one or more additional software agent workers or the predetermined percentage number of the one or more software agent workers when the one or more statistical values is less than a utilization threshold; and decreasing one or more of the predetermined integer number of the one or more additional software agent workers or the predetermined percentage number of the one or more software agent workers when the one or more statistical values is greater than the utilization threshold.

2. The method of claim 1, further comprising:
maintain the software agent workers of the agent workforce when the comparing indicates that the monitored resource utilization is within the desired resource utilization range.

3. The method of claim 1, further comprising:
additively deploying the one or more additional software agent workers by adding a predetermined number of the one or more additional software agent workers when the comparing indicates that the monitored resource utilization is less than the desired resource utilization range; and
multiplicatively removing a predetermined percentage of the one or more of the software agent workers when the comparing indicates that the monitored resource utilization is greater than the desired resource utilization range.

4. The method of claim 1, further comprising:
controlling a frequency of the comparing of the monitored resource utilization to the desired resource utilization range to control a frequency of the additively deploying of the one or more additional software agent workers, and the multiplicatively removing of the one or more of the software agent workers.

5. The method of claim 4, further comprising:
increasing the frequency of the comparing of the monitored resource utilization to the desired resource utilization range to increase the frequency of the additively deploying of the one or more of the additional software agent workers, and increase the frequency of the multiplicatively removing of the one or more of the software agent workers when the resource utilization is changing more than a threshold between successive monitoring times.

6. The method of claim 4, further comprising:
decreasing the frequency of the comparing of the monitored resource utilization to the desired resource utilization range to decrease the frequency of the additively deploying of the one or more of the additional software agent workers, and decrease the frequency of the multiplicatively removing of the one or more of the software agent workers when the resource utilization is changing less than a threshold between successive monitoring times.

7. The method of claim 1, further comprising:
monitoring the resource utilization of the first database periodically during the migration of the data,
wherein the resource utilization is at least one of processor utilization and memory utilization.

8. A system comprising:
a non-transitory storage medium storing computer program instructions; and
one or more processors configured to execute the computer program instructions to cause operations comprising:
deploying software agent workers to an agent workforce, the software agent workers migrating data from a first database to a second database;
monitoring resource utilization of at least one of the first database or the second database during the migration of the data;
comparing the monitored resource utilization to a desired resource utilization range;
when the comparing indicates that the monitored resource utilization is less than the desired resource utilization range, additively deploying according to an additive value one or more additional software agent workers to the agent workforce, the additive value indicating a predetermined integer number of the additional software agent workers to be deployed to the agent workforce, the one or more additional software agent workers migrating the data from the first database to the second database;
when the comparing indicates that the monitored resource utilization is greater than the desired resource utilization range, multiplicatively removing according to a multiplicative value one or more of the software agent workers from the agent workforce, the multiplicative value indicating a predetermined percentage number of the software agent workers to be removed from the agent workforce;
computing one or more statistical values based on the monitored resource utilization;
increasing one or more of the predetermined integer number of the one or more additional software agent workers or the predetermined percentage number of the one or more software agent workers when the one or more statistical values is less than a utilization threshold; and
decreasing one or more of the predetermined integer number of the one or more additional software agent workers or the predetermined percentage number of the one or more software agent workers when the one or more statistical values is greater than the utilization threshold.

9. The system of claim 8, wherein the operations further comprise:
maintain the software agent workers of the agent workforce when the comparing indicates that the monitored resource utilization is within the desired resource utilization range.

10. The system of claim 8, wherein the operations further comprise:
additively deploying the one or more additional software agent workers by adding a predetermined number of the one or more additional software agent workers when the comparing indicates that the monitored resource utilization is less than the desired resource utilization range; and multiplicatively removing a predetermined percentage of the one or more of the software agent workers when the comparing indicates that the monitored resource utilization is greater than the desired resource utilization range.

11. The system of claim 8, wherein the operations further comprise:

controlling a frequency of the comparing of the monitored resource utilization to the desired resource utilization range to control a frequency of the additively deploying of the one or more additional software agent workers, and the multiplicatively removing of the one or more of the software agent workers.

12. The system of claim 11, wherein the operations further comprise:

increasing the frequency of the comparing of the monitored resource utilization to the desired resource utilization range to increase the frequency of the additively deploying of the one or more of the additional software agent workers, and increase the frequency of the multiplicatively removing of the one or more of the software agent workers when the resource utilization is changing more than a threshold between successive monitoring times.

13. The system of claim 11, wherein the operations further comprise:

decreasing the frequency of the comparing of the monitored resource utilization to the desired resource utilization range to decrease the frequency of the additively deploying of the one or more of the additional software agent workers, and decrease the frequency of the multiplicatively removing of the one or more of the software agent workers when the resource utilization is changing less than a threshold between successive monitoring times.

14. The system of claim 8, wherein the operations further comprise:

monitoring the resource utilization of the first database periodically during the migration of the data, wherein the resource utilization is at least one of processor utilization and memory utilization.

* * * * *